Patented Oct. 19, 1937

2,096,317

UNITED STATES PATENT OFFICE 2,096,317

METHOD OF UTILIZING STAINLESS STEEL SCRAP

Vere B. Browne, Brackenridge, Pa., assignor to Allegheny Steel Company, Brackenridge, Pa., a corporation of Pennsylvania No Drawing. Application July 23, 1932, Serial No. 624,348

13 Claims. (Cl. 75—127)

This invention relates to the utilization of stainless steel scrap and to the production of low carbon alloy steel containing appreciable percentages of such scrap.

In the production of chromium iron alloys and chromium nickel alloys of the stainless type the utilization of the scrap resulting from the conversion of ingots of these alloys to various fabricated articles is a serious problem both economically and industrially and is a problem which involves many factors.

Most of the chromium alloys of the higher types are made in an electric arc furnace and since chromium has a great affinity for carbon it is relatively difficult to make these alloys with an extremely low carbon content. On the other hand, the characteristics of these alloys make it necessary to produce them with a very low carbon content which consequently necessitates the use of very expensive low carbon alloying material.

In the conversion of such alloy ingots into various fabricated articles there is from about 40 to 50% of scrap produced and in view of the above noted considerations particularly, the remelting of this scrap cannot be accomplished in the ordinary manner without resulting in the absorption of carbon by the molten scrap which, as a result, renders the product useless for most purposes. For example, there is a large demand for chromium nickel alloy steel containing about 18% chromium and 8% nickel and with a carbon content of less than .10%. In the production of this alloy under the ordinary shop melting methods it is impossible to utilize scrap of this composition because in melting it down it absorbs a sufficient amount of carbon to increase the content above the limit of .10% and as a result most of the tonnage of this composition is made by using high priced ferro-chrome and nickel to obtain the required percentage of these elements. The result of these conditions is that there exist relatively large accumulations of this scrap which cannot be successfully utilized except for the production of alloys for which the demand is rather limited.

One of the objects of the present invention, therefore, is the utilization of scrap of the above nature in the preparation of low carbon alloy steels.

Another object resides in a method of making low carbon alloy steels in which up to about 70% or more scrap in a given furnace charge can be used.

A still further object is to make low carbon alloy steels by first producing a melt of steel scrap and adjusting it to extremely low carbon content and then combining with the same a large proportion of stainless scrap and only a relatively small amount of alloying elements to bring the final composition to that desired, while still securing a low carbon alloy.

Other and further objects and advantages will either be understood by those skilled in this art or will be pointed out hereinafter.

I have discovered that I can utilize stainless steel scrap in appreciable amounts up to 70% or more in the making of low carbon alloys which thus enables me to produce higher grade alloys at a greatly reduced cost and at the same time enables me to utilize material which had formerly been of little value due to its very limited uses.

In carrying out the process of the present invention I first melt down a predetermined percentage of steel scrap and refine the same under an oxidizing slag until I have reduced the carbon content to approximately .03%. When the carbon content has been reduced to about this figure I remove the oxide slag from the molten charge and deoxidize and degasify the molten metal in accordance with the process outlined in my Patent 1,658,879. At the completion of this process the low carbon iron is covered and protected by a thin voluminous calcium aluminate slag which protects the iron from carbon absorption and also serves to protect the chrome nickel scrap which is subsequently added.

I now add incrementally to the furnace, which may be an electric arc furnace, chrome-nickel scrap having a carbon content which will not be sufficient to increase the total carbon content of the final bath above the required specification. I make each incremental addition in such a manner that it floats partly submerged in the slag, thus burning off any carbonaceous matter with which the scrap might be contaminated before each incremental addition is completely submerged in the protective slag. During this operation the volume and viscosity of the slag is maintained by suitable additions of fluxing reagents, such as alumina, fluor spar, etc. As soon as the predetermined percentage of scrap has been so melted I add in the same manner the necessary amount of chromium and nickel to compensate for the original iron content which was melted at the beginning of the process. In this way I produce and accomplish the above noted objects and advantages.

As an example of the foregoing, 7,000 pounds of steel scrap was melted down and refined in the manner described until its carbon content was lowered to about .03%. To this there was then added in incremental additions 10,000 pounds of chrome-nickel alloy scrap containing a carbon content of approximately .10%. After this was melted, 3,050 pounds of ferro-chrome containing .10% carbon was added and also 960 pounds of nickel. From the above charge there was produced a total weight of ingots of 19,350 pounds containing .068% carbon, 18.5% chromium and 8.5% nickel.

This example is illustrative of a particular operation of the invention, wherein about 50% of scrap was used and the material was produced at a saving of approximately $500.00 in comparison with the regular method of making the alloy composition by adding chrome and nickel to low carbon iron in the amounts necessary to give the ultimate required composition.

The above is intended more in an illustrative than in a limitative manner and I do not confine myself thereto other than as contained in the sub-joined claims.

For example, I do not confine myself to melting down the steel scrap in an electric arc furnace as it would be understood by those skilled in the art that I may obtain my initial charge of low carbon iron by transferring hot metal of the correct composition either from a Bessemer converter or from an open hearth furnace and thereafter I may then proceed with the remainder of the steps of the process as explained hereinabove.

While I prefer to use the calcium aluminate slag and reduce the iron with aluminum I may use any suitable slag-forming materials such as lime and fluor spar or lime and sand and I may also use any suitable reducing agent such as silicon or carbon to deoxidize the metal and form a reception slag for the scrap additions.

Similarly I do not confine myself to the limitation of .10% carbon. It will be equally well understood by those skilled in the art that the process could be applied with advantage to the production of alloys in which a more liberal carbon specification is permissible. The process is, however, particularly advantageous and desirable in the production of alloys specifying an extremely low carbon content, but the process is also equally applicable to the production of other alloys including straight chrome, chrome tungsten, chrome molybdenum and any other combination of alloying elements where it is desirable to utilize the scrap and maintain close limits of composition, especially close limits of carbon content.

What I claim as new and desire to secure by Letters Patent is:

1. In a method of the kind described, melting down a predetermined percentage of steel scrap, refining the same under an oxidizing slag until the carbon content is reduced to about 0.03%, removing the slag, deoxidizing and degasifying the molten metal, adding a calcium aluminate slag, incrementally adding chrome-nickel steel scrap in predetermined amount, and bringing the alloying elements of the whole up to the desired content.

2. In a method of the kind described, melting down a predetermined percentage of steel scrap, refining the same until its carbon content is about 0.03%, deoxidizing and degasifying the molten metal, covering the molten metal with suitable slag forming materials, incrementally adding a predetermined amount of chrome-nickel alloy scrap, and finally adjusting the alloy content of the whole by appropriate additions of alloying elements.

3. In a method of the kind described, melting down a predetermined percentage of steel scrap, refining the same until its carbon content is about 0.03%, deoxidizing and degasifying the molten metal, covering the molten metal with suitable slag forming materials, incrementally adding a predetermined amount of chrome-nickel alloy scrap, and finally adjusting the alloy content of the whole by appropriate additions of alloying elements, said slag forming materials being calcium aluminate.

4. In a method of the kind described, melting down a predetermined percentage of steel scrap, refining the same until its carbon content is about 0.03%, deoxidizing and degasifying the molten metal, covering the molten metal with suitable slag forming materials, incrementally adding a predetermined amount of chrome-nickel alloy scrap, and finally adjusting the alloy content of the whole by appropriate additions of alloying elements, said slag forming materials being lime and fluor spar.

5. In a method of the kind described, melting down a predetermined percentage of steel scrap, refining the same until its carbon content is about 0.03%, deoxidizing and degasifying the molten metal, covering the molten metal with suitable slag forming materials, incrementally adding a predetermined amount of chrome-nickel alloy scrap, and finally adjusting the alloy content of the whole by appropriate additions of alloying elements, said slag forming materials being lime and sand.

6. In a method of the kind described, forming a bath of molten steel, refining the same until the carbon content is lowered to approximately 0.03%, removing the slag formed by the foregoing, so treating the low carbon molten iron thus produced as to deoxidize and degasify the same and to form a calcium aluminate reception slag thereon, incrementally charging portions of chrome nickel scrap onto such reception slag, while suitably maintaining the volume and viscosity of the slag, and adjusting the composition of the bath by suitable additions containing chromium and nickel.

7. In a method of the kind described, forming a bath of low carbon iron or steel, deoxidizing and degasifying the same, forming a reception slag on such bath, incrementally adding chrome nickel steel scrap onto such reception slag, while suitably maintaining the volume and viscosity of the slag, and adjusting the composition of the bath by suitable additions of the alloying elements in such chrome nickel steel scrap.

8. In a method of utilizing chrome nickel steel scrap to make chrome nickel steel, forming an iron or steel bath, refining the same under an oxidizing slag, removing this slag, deoxidizing and degasifying the bath and forming a reception slag thereon, incrementally charging chrome nickel steel scrap onto such reception slag, while suitably maintaining the volume and viscosity of the slag, and adjusting the composition of the bath by adding thereto materials containing the desired elements in suitable proportions and amounts.

9. In a method of utilizing chrome nickel steel scrap to make high quality chrome nickel steel, reducing carbon steel scrap to molten condition, refining the same to lower the carbon content and to minimize oxides and gaseous constituents, covering the refined molten steel with a suitable slag, adding chrome nickel steel scrap and adjusting the alloy content of the molten steel by appropriate additions of alloying elements.

10. A method according to claim 9 wherein the slag on the refined molten steel functions as a reception slag and the chrome nickel steel scrap is incrementally charged onto such reception slag.

11. A method of making alloy steel containing about 18% chromium, about 8% nickel and about .10% carbon, with the remainder substantially all iron, comprising forming a molten bath from carbon-steel scrap containing no appreciable amounts of chromium, reducing its carbon content to about .03%, reducing oxide and gas contents to a low value, forming a slag covering over said bath, adding incrementally chrome-nickel alloy steel scrap of approximately the final analysis desired, and then adjusting the composition of the bath by appropriate additions of low-carbon ferro-chrome and nickel.

12. A method of making alloy steel of the 18% chromium, 8% nickel, low carbon type comprising producing a molten mass of steel with a carbon content in the neighborhood of .03% and substantially free from chromium, minimizing oxide and gaseous inclusions, forming a covering slag on the molten mass, charging on the slag chromium-nickel alloy steel scrap of approximately the analysis ultimately desired and then making appropriate additions of low-carbon ferro-chrome and nickel.

13. A method of the kind described comprising melting down a predetermined amount of carbon steel scrap, refining the same until the carbon content is reduced to a figure in the neighborhood of .03%, covering this low-carbon bath with a protective slag, partially submerging incremental additions of stainless steel scrap of approximately the analysis ultimately desired in said protective slag until a total predetermined amount of such scrap has been incorporated in the bath and then adding alloying ingredients in such kind and amount as will adjust the composition of the bath to approximately that ultimately desired.

VERE B. BROWNE.